Dec. 21, 1943.    D. GUTZMANN    2,337,099
ORNAMENTAL ARTICLE AND METHOD OF MAKING SAME
Original Filed June 9, 1941
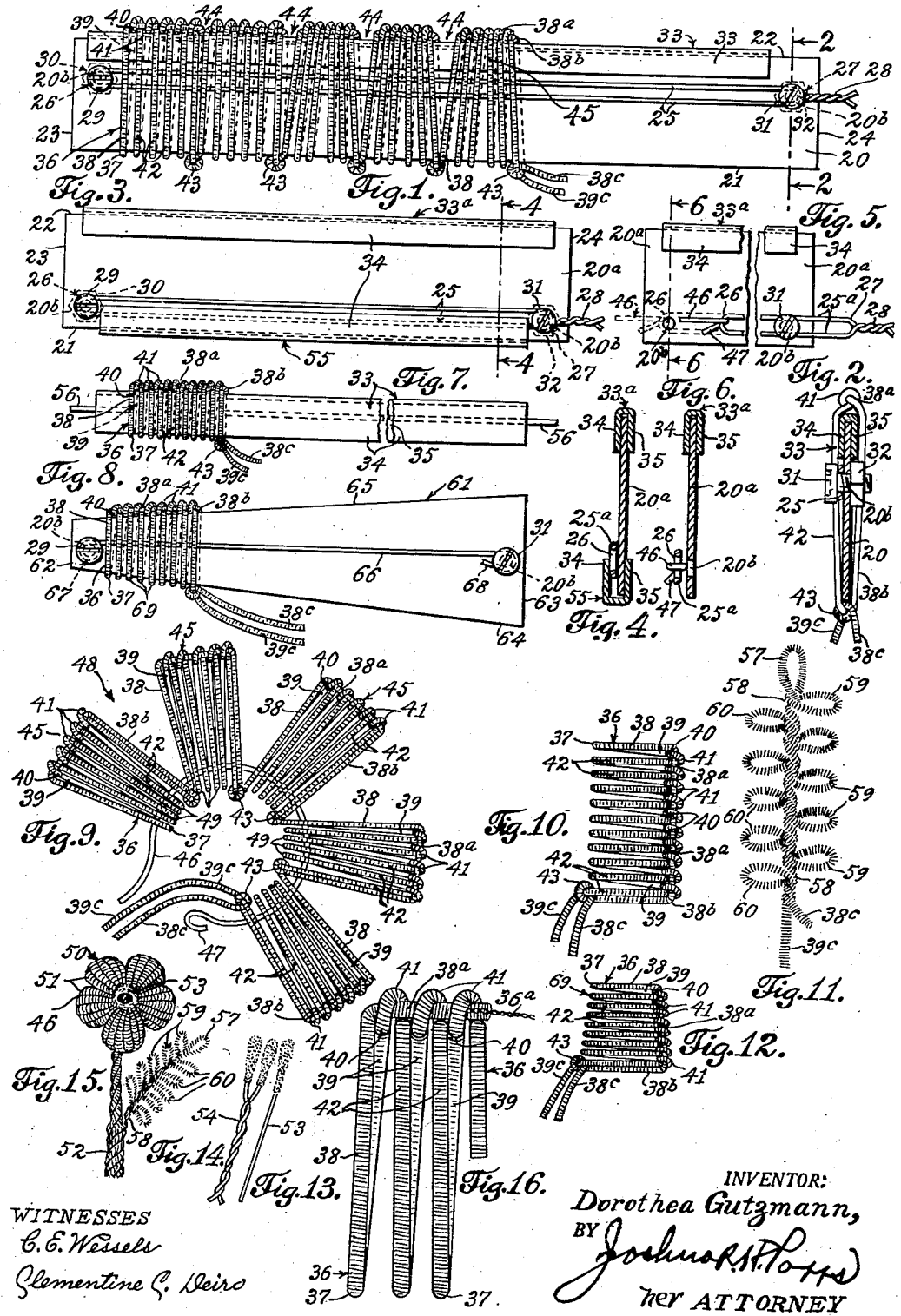
WITNESSES
C. E. Wessels
Clementine C. Deiro
INVENTOR:
Dorothea Gutzmann,
BY
her ATTORNEY Patented Dec. 21, 1943

2,337,099

UNITED STATES PATENT OFFICE 2,337,099

ORNAMENTAL ARTICLE AND METHOD
OF MAKING SAME

Dorothea Gutzmann, Chicago, Ill.

Original application June 9, 1941, Serial No. 397,247. Divided and this application January 26, 1942, Serial No. 428,151

19 Claims. (Cl. 41—10)

My invention relates to the art of making ornamental articles such as flowers and branches or leaves and stems and the object thereof is to provide or produce efficiently and quickly ornamental flowers, leaves and the like as well as a new article of manufacture and novel method of efficiently producing the same and is a divisional application of my prior application Serial No. 397,247, filed June 9, 1941, entitled Art of making ornamental articles.

Another object of the invention is to provide a novel ornament and a method of making the same with means to facilitate the teaching of and learning by beginners or apprentices of the various strokes, movements or threading of the tufted or other wire cord as well as to make possible a substantial increase in the output of production of such articles.

Another object of the invention is to provide a novel method of making ornaments using a tool, instrument or device including a needle which can be made in various sizes, that is, widths or breadths and lengths, to mount loops and permit formation of leaves of various sizes and shapes or species simulating those occurring in nature for making plants, flowers, stems and branches and the like for the various sizes and kinds occurring in nature for use in decorative or ornamental work and of single, double, plural or multiple colored designs which are original and distinctly artistic, attractive and ornamental for corsages, hats, artificial plants, artificial flowers and other purposes.

Still another object of the invention is a method and means to conveniently hold and support as well as facilitate the formation and separation of a series of loops forming the petals or leaves upon the needle from which the same are easily and quickly removed by merely slipping or sliding the loops off of the needle at either end and to facilitate the insertion of a single or other anchoring or tie wire for drawing the petals or the like into a certain desired shape or arrangement for imitating a particular flower or the like in colors corresponding to the natural product or article in various colors or combination of colors or shades as desired.

Other objects and advantages will appear hereinafter and be brought out more fully in the following specification, reference being had to the accompanying drawing, wherein:

Fig. 1 is an elevation or top plan of needle forming the tool or instrument on which petals of a flower or leaves are formed and showing the manner of forming same;

Fig. 2 is a cross section taken on the line 2—2 of Fig. 1.

Fig. 3 is a view similar to Fig. 1 of a smaller and modified form;

Fig. 4 is a cross section taken on the line 4—4 of Fig. 3;

Fig. 5 is a view similar to Figs. 1 and 3, with a portion broken away and showing the manner of removing the formed petals or leaves by insertion of a tie wire;

Fig. 6 is a cross section taken on the line 6—6 of Fig. 5;

Fig. 7 is an enlarged elevation of a channel edge guard plate used as a former, with part broken away;

Fig. 8 is an elevation of a tapered tool plate or strip for forming a tapered petal, leaf or a calyx or stem;

Fig. 9 is a view of the formation of Fig. 1 removed from the tool and partially drawn together;

Fig. 10 is an elevation of the formation of Fig. 7 removed and enlarged;

Fig. 11 is an elevation of the formation in Figs. 7 and 11 removed and formed into petals or leaves (fern);

Fig. 12 is an elevation of the formation of Fig. 8 removed;

Figs. 13 and 14 are elevations of a single and double stamen;

Fig. 15 is an elevation of a flower and leaf formation combining Figs. 9, 10, 11 and 13; and Fig. 16 is an enlarged fragmentary view of a chenille wire formation.

Referring to the drawing and more particularly Figs. 1, 2, 9 and 16, the needle constituting a part of the device forming the tool or instrument consists of an elongated plate or strip 20 of sheet metal, hard rubber, molded or other plastic material. This strip forming the needle proper, flat mandrel or form, may be of rectangular or other shape, the rectangular form shown having a bottom edge 21, a top edge 22, a left hand end or edge 23 and a right hand end or edge 24. One of the most important features of the invention is to mount upon a strip, means over which the loops are formed from some corded material or wire, preferably in the form of chenille of tufted cord, silk, worsted, wool or cotton, so as to locate or position a tie or anchoring wire therethrough, and over which the loops are formed for drawing the bunches or groups of loops together in a prescribed arrangement to simulate a given flower, plant, leaf or the like or other desired article. The invention therefore consists broadly in means for detachably and removably mounting the wire or means for drawing a wire through the loops so that the loops will be strung along the same when removed from the plate or strip forming the needle proper and as shown, this means is in the form of a pull or slip wire 25 shown in the form of an elongated loop having one closed end 26 illustrated as the left hand end and another closed end 27 illustrated as the right hand end formed by bending a strand of wire such as copper wire or other suitable material of a flexible and pliable nature which will stand up under constant bending, and twisting the end portions thereof together as indicated at 28 although such ends may be otherwise suitably joined or connected. Means is then provided for mounting this loop upon the strip at the ends 26 and 27 so as to prevent displacement or shifting thereof during the formation of the petal or leaf producing loops of the tufted wire or chenille as will be hereinafter described. For this purpose, any suitable means may be provided for anchoring the ends of the pull or slip wire shown in the form of a loop 25 and which may be a single strand as will also be hereinafter more fully set forth. In the form shown apertures 20b are provided in the strip 20 near the ends thereof to take bolts or screws 29 and 31. The bolt 29 is disposed through the left hand hole to take a nut 30 on the bottom where the hole or aperture is left unthreaded or too large to thread the bolt or screw thereinto and the bolt 31 is adapted to take a nut 32 for the same reason. Thus, the ends of the loop 25 may be held under the heads of the bolts or screws or other retaining means to hold the same against the plate and permit disengagement of one or both ends so that the loop constituting the pull or slip wire may be drawn longitudinally and removed from or slipped off of the strip after the petal or leaf producing loops are formed and so that they may be conveniently anchored or tied together as well as drawn tight into separate bunches forming the various petals or leaves. Both of the ends of the loop 25 may be released or simply one of the bolts may be disengaged and removed or released from the closed end of the loop and in such case, the twisted end 28 will serve as grasping means to draw the slip or pull wire formed by the loop 25 longitudinally with the loops formed on the strip which are merely pushed off by the fingers.

If desired, the sharp or longitudinal edges of the strip 20, especially when the latter is formed of sheet metal or any precious metal, which may have a finished or polished appearance such as gold, silver, chrome or nickel plated or the like or a suitable plastic finish in some tough, stiff or pliable and non-breakable plastic material may be made blunt or rounded to prevent cutting of the threads, cords, or strands, especially without wires, and prevent injury to or cutting of the fingers or hands, and as shown, may be fitted or provided with permanent, or removable metal or other channel members 33 to provide smooth or rounded protective edges for the petal or leaf producing loops. A channel shaped member 33 is shown fitted on or disposed over the edge 22 for this purpose and to space the threads from the opposite sides of the plate proper. This channel member has a top flange 34 and a bottom flange 35 and the bight portion is disposed to fit in close proximity to or against the edge 22 with the U-shaped or channel member frictionally held on the strip against the opposite faces thereof. Of course, these channel members may be disposed on one or both longitudinal edges of the strip or the edges may be turned over or flanged to round the same and produce a blunt edge as well as to form a space between the faces of the plate and the outer faces of the channels or side flanges thereof so as to accommodate the slip or pull wire such as the loop 25 and facilitate drawing the same through and under the loops or the lengths or plies thereof at one side of the strip forming the needle.

The chenille or tufted wire cord is indicated at 36 having a foundation wire 36a composed of two twisted strands and may be of tufted cord of silk, worsted, wool or cotton or other suitable material. In starting the formation of the petals, leaves or other objects, a length of the wire or cord is bent on itself intermediately or formed in a loop 37 around the needle or strip 20 with the bight or bent portion against one edge such as the bottom edge 21 and extending upwardly at the front as indicated at 38 and also upwardly at the back as indicated at 39 so that the portion 38a extending from the portion 38 forms a straight portion or binding at the top of the loops and bends horizontally along the top edge 22 to subsequently form the portion 38b at the back and the loose ends 38c and 39c which are continuations of the front and back portions 38 and 39 to form a stem or foundation for a stem in connection with other portions to be hereinafter described. The portion 39 at the back is then twisted or turned around the portion 38a being first extended forwardly under the same as at 40 and then over at 41 and under the portion 38a and down in the front as indicated at 42 and then looped under the bottom edge 21 and up at the back to repeat the portion 39 and continuing this threading, twisting, looping or knotting around the portion 38a to form any number of loops upon the needle or strip 20. These loops may be arranged in series or groups of any number producing bunches which are spaced apart to form the prescribed petals or leaves, by way of example and for this purpose, the portion 38a which is continued from the portion 38 is extended at 38b down at the back while the portion 42 extending down at the front is knotted, tied or twisted therewith together at the bottom edge as indicated at 43 to form an anchor and a separation or dividing means between the adjacent groups or bunches of loops of the series. Five of such groups are shown in Fig. 1 and the ends form the portions 38c and 39c after the last anchor 43 so that the groups are separated especially at the top edge as indicated at 44 between the respective bunches or groups 45 which are thus of similar formation or more restricted and narrower at the top by reason of being twisted together in the manner described and tapering toward the top or edge 22 while the sides and bottom or bight portions of the loops are spaced apart to be subsequently drawn together in narrower relation than the top edges by reason of the omission of the twisted or loop portions at the bottom as it is thought will be obvious. A chenille wire or cord 46 is then formed with a loop or hook 47 to connect to one end of the pull or slip wire formed by the elongated loop 25 at the closed end 26 and upon disengagement with the anchoring means such as the bolt or screw 29, the wire 46 may be readily pulled or drawn under the top portions of the loops thus formed upon the needle. This wire is used to string the groups of loops forming the series and after one end of the wire 46 is disconnected from the pull or slip wire, the ends of the wire 46 are grasped and the loops slipped off of the needle together with said wire 46 so that they may be drawn together in a circle or gathered as indicated at 48 in Fig. 9 of the drawing with outwardly widening or divergent spaces between the groups of loops. The inner or bight portions of the loops of chenille wire are thus drawn together closely or in contact as indicated at 49 at the inside so as to be narrower than the outer portions 45 with the resultant formation of a flower or leaf as indicated at 50 in Fig. 15 of the drawing composed of a series of petals 51 in the case of a flower, simulating any desired flower occurring in nature. The form shown is a flower of five petals corresponding to the number of bunches of loops and by twisting the portions 38c and 39c together with the ends of the wire 46 which may be twisted with a wire 52, such as green for a stem, formed of chenille, this produces the stem as represented at 52 in Fig. 15 of the drawing. Before the wires 38c, 39c and the ends of the wire 46 are twisted together, a single stamen 53 or a plural or double stamen 54 as shown in Figs. 13 and 14 may be inserted within the tie wire 46 and the bunches of loops which are strung thereon to be twisted with the ends of the wire 46 and the portions 38c and 39c to form a flower 50 as seen in Fig. 15, a leaf or other formation.

In Figs. 3, 4, 5 and 6 of the drawing, a modified form of the device is shown in which the needle or strip forming the plate 20a is shorter and has a channel 33a along one edge, being the top edge as illustrated. The channel 33a corresponds to the channel 33 and these channels preferably terminate in spaced relation to the ends of the strip or plate forming the needle and thus are made shorter than the strips. The purpose of the needles of different lengths and widths or breadths is to produce various sizes of loops as well as the number thereof depending upon the particular plant, flower, leaf or other corresponding object or ornament to be reproduced. In this instance, instead of having the pull or slip wire forming the loop 25 or a single wire mounted as shown in Figs. 1 and 2, near the center, in the center or nearer the top edge of the strip, it may be mounted near the bottom edge as shown in Figs. 3 to 6, inclusive, at 25a and the ends of the pull or slip wire detachably anchored in the manner described in connection with the wire 25 or in any other suitable way as by a notch in the plate adjacent each end of the wire, a pivoted clip or an elongated slot in which the clamping bolt or screw is slidable to release the wire, or in many other ways as will be apparent to one skilled in this art. Also, the needle may be formed of a loop of wire corresponding to the length and width of the plate desired and the sizes and number of the loops to be formed similar to the formation of the loop forming the pull wire 25 or 25a but somewhat wider. As shown in Figs. 3 to 6, inclusive, the pull or slip wire 25a is mounted near the bottom edge with the same kind of fastenings employed in Figs. 1 and 2 and as stated in connection with Fig. 1, a channel 55 similar to the channel 33 may be mounted on the bottom edge 21 of the plate 20. This not only gives a somewhat rounding formation of the loops at the top and bottom or outer and inner edges thereof but spaces the loops from the faces of the plate or strip so that the slip wire for drawing the tie wire longitudinally through the loops or beneath the same as well as for accommodating the pull wire either single or double as described, will be easily accommodated without interfering with the loops or catching thereon. In Figs. 3 and 4 a channel 55 similar to channels 33 and 33a is shown mounted on the bottom edge 21 and in such a manner as to overlie the pull wire or one strand thereof, or a single pull wire held beneath one of the flanges or sides of the channel so as to be anchored temporarily while the loops are being formed and then slipped out of the open side of the channel for removing the same with the loops strung thereon to be tied or anchored in any desired shape as described in connection with Figs. 9 and 15 for forming various petals, flowers, leaves and the like. When a pull wire of loop form as indicated at 25 and 25a is employed and anchored by a channel, the fastenings such as the screws or bolts 29 and 31 constituting removable mounting and clamping means may be omitted entirely or a single strand of wire or other tie member may be anchored between the channel and the strip forming the needle and frictionally held for removal with the loops. In employing the loop type of pull wire or member, the bunches 45 may be removed after pulling the single wire 46 beneath and into the same and between the loops at one side and the needle at one face of the strip by releasing one end of the pull wire and looping or hooking one end of the wire 46 through one closed end of the loop forming the slip or pull wire as indicated at 47 in Figs. 5 and 6 of the drawing and then drawing the pull wire longitudinally at the end portions 27 and 28 to bring the wire 46 through the loops 42 and between the same and the face of the plate or strip forming the needle so that the entire formation may be slipped off of the needle and drawn to shape by the wire 46 which forms the anchoring or tie wire and shifting means. The channels also serve to cover the sharp edges of the strip or plate and prevent injury to the fingers of the person using the same as well as sharp bending or cutting of the wire or cord forming the loops. It is also be be understood that the loops when formed into bunches as indicated in Fig. 9 to produce petals, leaves or other objects may be bent into various shapes to simulate different petals or leaves and the like and the wire 38a which forms a border wire or binding around the outer edges of the groups or bunches of loops forming the petals or the like may be bent into various shapes to simulate the different species of petals of various flowers or leaves of various trees or other plants and the number of bunches varied accordingly to agree with the number of petals or leaves on the particular flower or plant. For instance, as shown in Fig. 9, the outer edges of the groups of loops are substantially straight and are somewhat rounded in Fig. 15 upon forming the petals.

In Figs. 7 and 10 of the drawing, a channel 33 is shown detached from a strip and forming a needle of itself to receive a slip or pull wire 56 between the sides or flanges forming the top and bottom portions 34 and 35 thereof in which the same is frictionally held with the extremities projecting. This channel corresponds to the channels 33a and 55 and may be made of varying widths or breadths and lengths the same as the strips 20 and 20a although the channels are usually made shorter than the strips, especially where employed in connection therewith and as shown, the channel 55 is shorter than the channel 33a. When a channel is employed for forming the loops, the latter are produced in the manner as previously described in connection with Fig. 1 as shown in Fig. 7 but instead of being twisted, tied or anchored as at 43 to produce separate short bunches, may be formed in longer groups with a larger number of loops and then twisted, tied or anchored at 43 as shown in Figs. 7 and 10, the latter figure showing the loops enlarged and removed from or slipped off of the needle formed by the channel. These loops may be bent first towards the top and then alternately toward opposite sides, to form a top leaf 57 and then twisted as at 58 with a laterally extending petal or leaf 59 towards the right and alternate leaves or petals 60 extending toward the left with the wires looped or twisted in between to form the stem and the ends 38c and 39c designed to be anchored to a larger stem or to be used in conjunction with the flower 50 and stem 52 thereof by anchoring the same beneath the twisted wire 52 which is wrapped around the entire assembly. In other words, the formation of Figs. 7, 10 and 11 may produce flowers or leaves for flowers or leaves of a plant such as a fern or the like. It is also to be understood that the leaves or petals may be bent in the same direction and in circular formation or arranged to overlie or overlap one another entirely or partially at the sides, or telescoped to simulate other plants, flowers or leaves and a border crocheted around the outer edges of the loops or a scalloped edge formed on the periphery of the flower or leaf by looping a thread through the loops 42 at their outer portions or otherwise. Also, this formation of loops may be left tubular or frustoconical as shown in Fig. 12, to produce an enlarged stem or calyx 69 of a flower or corresponding formation of the stem of a leaf or plant or a tubular petal or leaf of tufted wire or chenille.

In Figs. 8 and 12 of the drawing, the loops are correspondingly formed in graduating sizes upon a tapered strip or plate 61 corresponding to the axial section of a frustrum of a cone or trapezoid with a narrow end 62, a wide end 63 and converging top and bottom edges 64 and 65 with or without the channels mounted thereon. These channels form bindings or rounded edges and may be produced by turning the edges of the strip, or otherwise suitably formed, bent or molded thereon or removably attached thereto in addition to being frictionally held as shown and described. A slip or pull wire 66 in the form of a single strand may be mounted in any suitable way along the longitudinal axis of the strip or needle 61 and is shown anchored at its ends as by the screws or bolts 29 and 31 and one or both ends may be formed with a loop 67 or a loop or hook 68 so that by loosening or removing one screw or bolt as described in connection with the slip or pull wires 25 and 25a or a tie wire 46 which may be used with the wire 66, the slip or pull wire which might form the tie or anchoring wire upon which the loops are strung and gathered or drawn together in a simulation to form a petal or leaf, may be removed from the plate at the same time that the loops 42 are slipped off of the same at one end, in this instance the small end 62 or by pulling a tie wire corresponding to the tie wire 46 through the and beneath the loops by hooking an end such as 47 through the loop or hook 68, in the same manner as described in connection with Figs. 3 to 6, inclusive. This formation is tapered and Fig. 12 shows the loops removed from the needle to be shaped like a funnel or the like or to form the calyx portion 69 of a stem as of a tulip, carnation or the like or petals of a tulip bulb or the like. Of course, this formation may be used for various types of petals or leaves as it is thought will be obvious. Also, in either formation as described, different colors of chenille or tufted wires may be employed to produce flowers having various combinations of colors with ribs or webs forming the veins as of a leaf or for anchoring the petals of leaves intermediately or for producing one or more colors on one side and different colors or combinations of colors on the other side or with a border corresponding to the wire 39—41 or 38—38a of a color contrasting to the other color or colors of the loop forming the petals and thereby producing a very decorative, ornamental and artistic effect. The channels may also be used for bending or shaping the petals or leaves to simulate the natural article or other tools, especially having rounding faces, may be employed for this purpose. The petals may also be drawn up into a closed formation to indicate a bulb or flower of a type corresponding to a tulip but in each instance, the present invention results in an improvement in the art of making ornamental articles such as flowers, leaves or plants and a new article of manufacture and method and means of producing the same by which the teaching of the art to beginners or apprentices may be facilitated either in class or home instruction upon acquiring a set of implements, tools or instruments constituting the device including the needles and the other articles described as cooperating therewith in the various sizes desired and needed for producing the various articles and that the output or production made possible by the use of such a device is greatly increased and the quality of the product enhanced.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims. However, it may be explained that the loop 25 or 25a detached from the plate or strip 20 or 20a can be used as a tool or needle and as many small loops of chenille, tufted cord or the like as desired, formed thereon as described in connection with the strips 20, 20a, 61 and channels 33, 33a and 55, to form a button or center for a flower or other ornament formation later. However, the loop such as 25 is then mounted on the strip such as 20 and the large loops formed on the strip as previously described with the same or connected chenille of any desired color to form the petals or leaves. All the loops of tufted cord are then removed from the loop or needle 25 and the strip by pulling out the slip or pull wire or loop 25, with a chenille wire or cord 46 attached thereto as previously described to tie or anchor the petals, in either direction, but preferably toward the left so that the small loops are removed last. These small loops may then be formed into a button or center similarly anchored by the same or a separate tie wire or cord such as 46 and the groups or bunches of large loops pulled or closely arranged around the button or center and anchored thereto by the tie wire 46 or otherwise to complete the formation.

Having thus described my invention, what I claim as new and desire to secure by Letters Patent is:

1. In the art of making ornamental flowers, leaves and the like, forming loops upon a mounting member, twisting the material of each loop together at one side of the mounting member and then removing said loops, said loops being joined in a single formation and bending said loops to form petals or leaves.

2. In the art of making flowers or the like, forming loops upon a form, twisting the material of each loop at one side of the form, tying the material of certain of the loops at the other side of the form to form successive groups for spacing said groups apart at the first mentioned side, removing said loops and tying the same at the second mentioned side.

3. In the art of making flowers or the like, forming loops in a straight line upon a mandrel, removably mounting a slip wire upon the mandrel over which the loops are formed, disposing a tie wire beneath the loops for removable engagement with the slip wire, slipping the loops and tie wire off of the mandrel and anchoring the loops thus strung into shape.

4. In the art of making ornamental articles such as flowers, leaves or plants, forming loops of tufted wire or cord upon a strip, twisting said wire between the loops to form a border, anchoring the end loop, stringing the loops upon a wire and drawing the same to shape.

5. In the art of making ornamental articles such as flowers or leaves and the like, taking a length of flexible tufted strand and bending the same intermediately to form a bight portion and side portions, arranging said bight portion upon a needle, intertwisting the side portions to form successive loops with a binding along one edge, one side portion being looped around the needle and anchoring said portions at the bottom of the last loop.

6. In the art of making ornamental articles such as flowers or leaves and the like, taking a length of flexible tufted strand and bending the same intermediately to form a bight portion and extremities, arranging the bight portion upon a strip, intertwisting said extremities to form successive loops with a binding along one edge, one extremity being looped around the strip, arranging said loops in groups by anchoring certain of the loops at the bottom therebetween and slipping the loops off of the strip with a slip wire for subsequently stringing and gathering said bunches of loops to form an article of the desired design.

7. In the art of making ornamental articles such as flowers or leaves and the like, taking a length of flexible tufted wire and bending the same intermediately to form a bight and side portions, arranging said bight portion upon a needle, intertwisting said side portions to form successive loops with a binding along one edge, one side portion being looped around the needle successively, arranging said loops in groups by anchoring the last loop of each group at the bottom therebetween by twisting the side portions at such points, and drawing a pull wire along the needle beneath the loops to dispose a tie wire through the loops forming a stringing and anchoring member to arrange the loops in a desired shape gathered together or extending in various directions.

8. In the art of making ornamental articles such as flowers or leaves and the like, taking a length of flexible tufted strand and bending the same intermediately to form a bight portion and end portions, arranging said bight portion upon a needle, intertwisting said end extremities to form successive loops with a binding along one edge, one end portion being looped around the needle, arranging said loops in groups, anchoring the loops at the ends of the groups along the outer edge by connecting the end portions at such points, drawing a pull wire along the needle beneath the loops to dispose a tie wire through the loops forming a stringing and anchoring member to arrange the loops in a desired shape gathered together or extending in various directions and subsequently combining and anchoring therewith other parts of a stem, flower, leaf or plant.

9. An ornament formed of flat loops connected at the top, certain of the loops being tied together at the bottom, a tie wire disposed beneath the loops at the bottom thereof to string the same, said loops and tie wire being bent to anchor the loops thus strung into shape.

10. An ornament for making ornamental articles such as flowers, leaves or plants, formed of flat loops of tufted wire or cord in strip form, said wire being twisted at one edge between the loops to form a border and the end loop anchored at the opposite edge, and a wire stringing the loops to draw the same to shape.

11. An ornament for making ornamental articles such as flowers, leaves or the like, comprising a length of flexible tufted strand bent intermediately to form side portions and a bight portion, the side portions being intertwisted at the top to form successive loops with a binding along one edge, one side portion being looped and said portions being anchored at the bottom of the last loop.

12. An ornament of the class described composed of a length of flexible tufted strand bent intermediately to form a bight portion and extremities, said extremities being intertwisted to form successive loops, and a binding along one edge, one extremity being looped, said loops being arranged in bunches and anchored at the bottom therebetween with the end portions connected at such points and a slip wire extending through the bunches of loops to string and gather the same to form an article of the desired design.

13. In an ornamental article such as a flower or leaf and the like, a length of flexible tufted wire bent intermediately to form a bight and side portions, said side portions being intertwisted to form successive loops with a binding along one edge, one side portion being looped and the loops being arranged in groups and the side portions being twisted at the bottom between the groups to anchor the same at such points, and a pull wire drawn along and beneath the loops to form a tie wire through the loops to string and anchor the same and to arrange the loops in a desired shape and gathered together or extending in various directions.

14. In the art of making ornamental articles such as flowers or leaves and the like, taking a strand and bending the same on itself to form a bight portion and side portions, arranging said bight portion around one edge of a mandrel, repeatedly looping one side portion around the mandrel, intertwisting said side portions after the formation of each loop to form successive loops with a binding along one edge of the mandrel, and knotting certain of the loops along the other edge of the mandrel as the loops are formed to arrange the loops in bunches of a plurality of loops in each bunch.

15. In the manufacture of an ornament, the steps which consist of looping one end portion of a strand having two end portions around a mandrel, twisting said end portion around the other end portion of said strand, and making a plurality of loops around said mandrel and twisting the two end portions together after the completion of each loop.

16. In the manufacture of an ornament, the steps which consist of looping one end portion of a strand having two end portions around a mandrel, twisting said end portion around the other end portion of said strand, and making a plurality of loops around said mandrel, twisting the two end portions together after the completion of each loop, looping both end portions around the mandrel and connecting the same after forming a plurality of loops.

17. The method of making ornaments consisting in holding part of a strand of material against a mandrel, looping another part of said strand around the mandrel and twisting it around the part being held, looping the strand repeatedly around said mandrel, twisting said strand around the end being held after making each loop to anchor one end of each of said loops, tying the free ends of certain of said loops, disposing a slip wire beneath the loops and connecting a tie wire to said slip wire for connecting the loops.

18. In the manufacture of an ornament, the steps which consist of looping one end portion of a strand having two end portions around a mandrel, twisting said end portion around the other end portion of said strand, and making a plurality of loops around said mandrel, twisting the two end portions together after the completion of each loop, removably mounting a slip wire on the mandrel over which the loops are formed and detachably connecting a tie wire to the slip wire to be drawn through the loops by means of the slip wire upon withdrawing the mandrel or slipping the loops off of the mandrel.

19. An ornament comprising a strand having two end portions, one end portion defining a plurality of loops, the strand defining each of said loops being connected to the other end portion of said strand to secure the loops together at one end and both end portions being formed into a loop and tied together with the remaining loops spaced apart at the side opposite where the end portions are connected.

DOROTHEA GUTZMANN